Feb. 16, 1954          L. LEE II                2,669,093
         CONTROL APPARATUS FOR INTERNAL-COMBUSTION ENGINES
Filed Jan. 10, 1947                           2 Sheets-Sheet 1
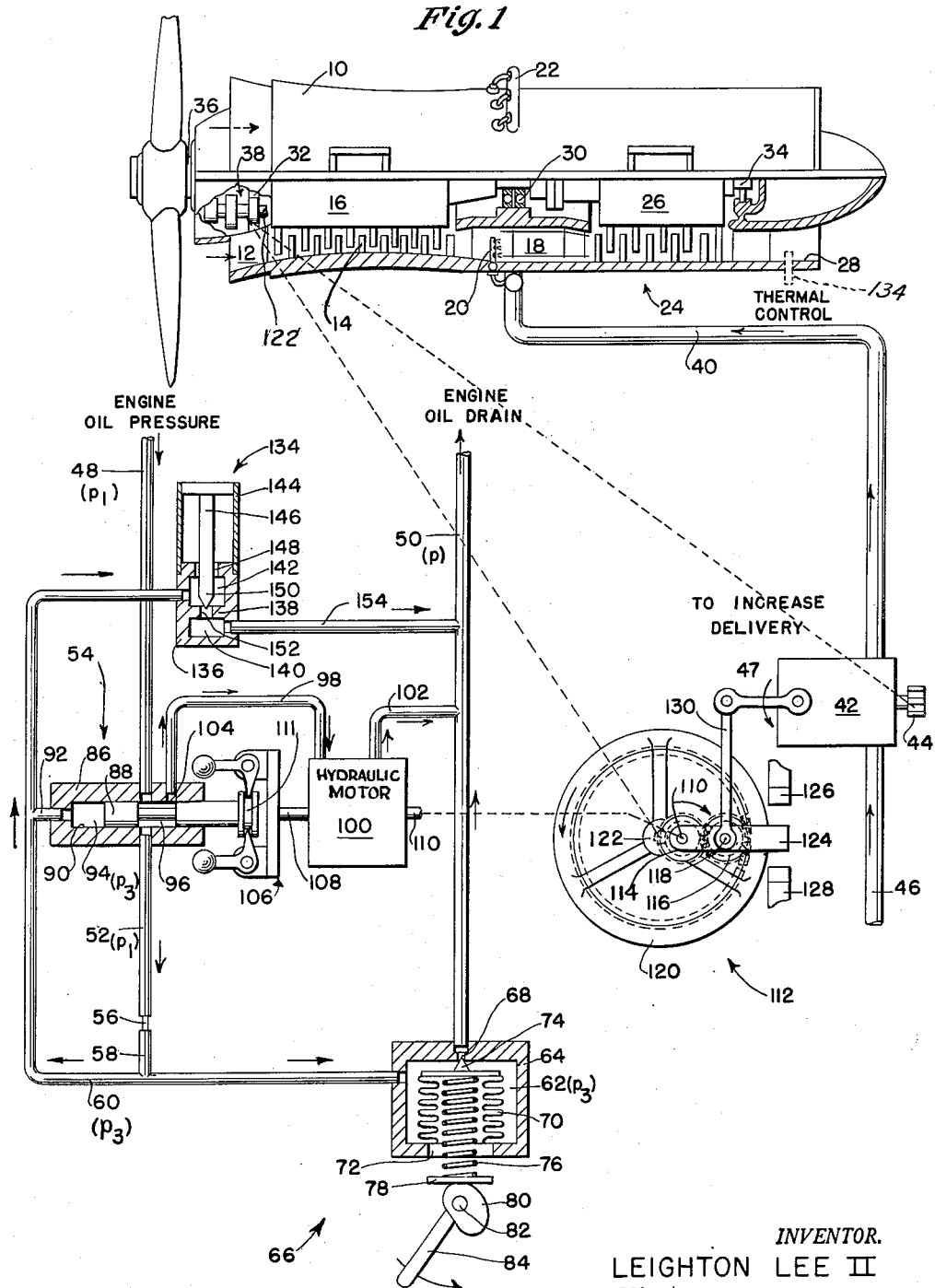
INVENTOR.
LEIGHTON LEE II
BY
            AGENT Feb. 16, 1954             L. LEE II             2,669,093
CONTROL APPARATUS FOR INTERNAL-COMBUSTION ENGINES
Filed Jan. 10, 1947                            2 Sheets-Sheet 2
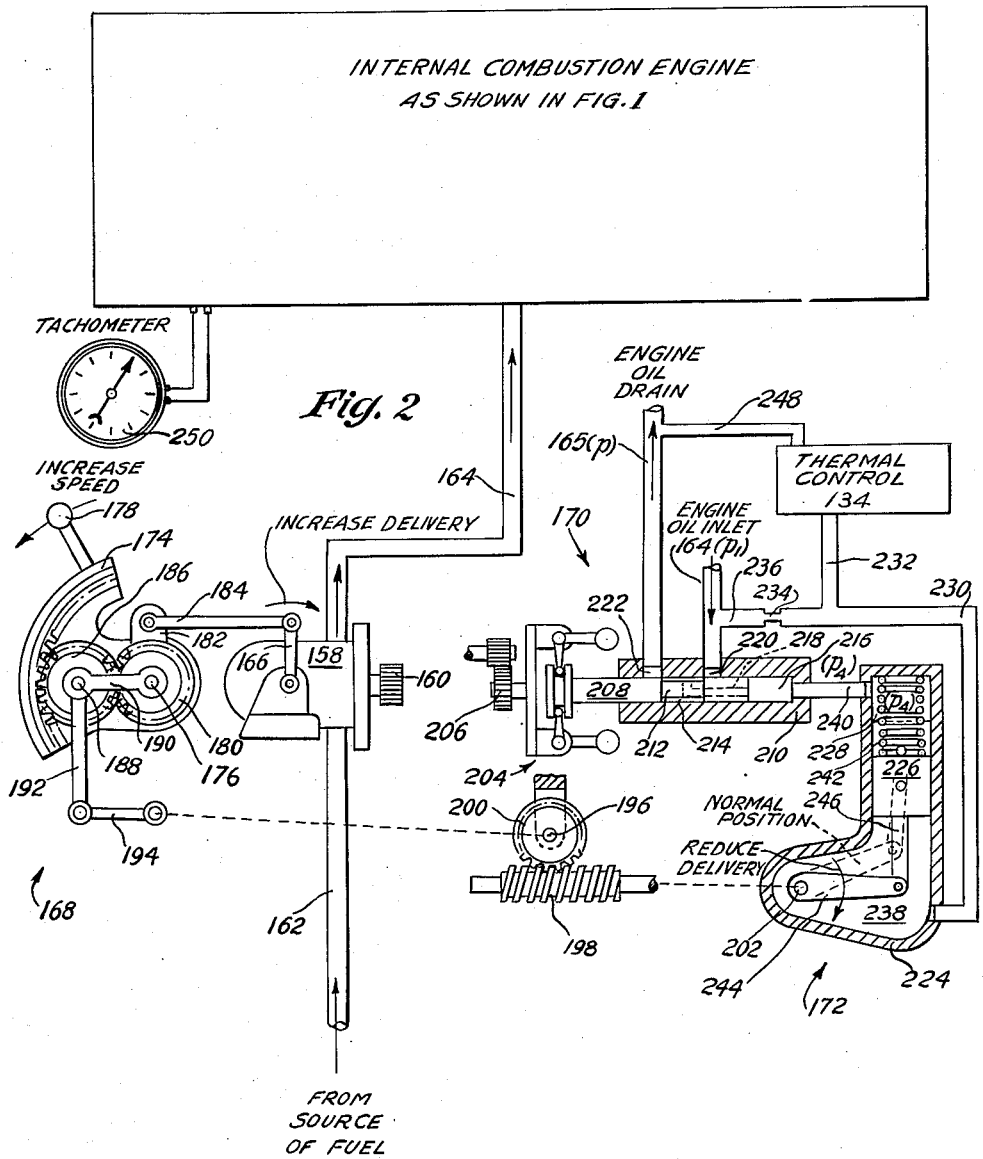
INVENTOR.
LEIGHTON LEE II
BY
Lester W Clark
AGENT Patented Feb. 16, 1954

2,669,093

UNITED STATES PATENT OFFICE 2,669,093

CONTROL APPARATUS FOR INTERNAL-COMBUSTION ENGINES

Leighton Lee II, Rocky Hill, Conn., assignor to Niles-Bement-Pond Company, West Hartford, Conn., a corporation of New Jersey Application January 10, 1947, Serial No. 721,269

14 Claims. (Cl. 60—39.28)

The present invention applies to fuel and speed control apparatus for prime movers, and particularly for internal combustion engines, inclusive of gas turbines and combination gas-turbine-and-jet engines.

The particular embodiments of the invention shown and described herein are intended for control of fuel delivered to an internal combustion engine suitable for jet-propulsion, propeller-propulsion, or combined propeller-and-jet propulsion of aircraft. Such an engine usually includes a compressor, one or more combustion chambers, a turbine, and a tail pipe, in the stated order of arrangement. Associated with the engine is a fuel pump for delivering fuel to the combustion chambers and connected to the compressor shaft, there is a gear train for driving a propeller shaft and certain accessories.

The normal range of engine speed varies from a minimum value, which approximates 8,000 R. P. M. in the particular engine described herein, to a corresponding maximum or full-speed value approximating 13,000 R. P. M. The engine is accelerated by external starting means to the minimum speed, at which self-operation occurs and the external means ceases to function.

Both speed and temperature control are critically important in operation of an internal combustion engine such as described, principally owing to structural and metallurgical limitations of design. Moreover, the engine speed is of primary concern to the operator, since performance of aircraft in flight is predicted on the basis of several factors of which engine speed is one of the more important.

It is therefore desirable to provide fuel and speed control apparatus which enables the operator to regulate the engine speed as desired and to render such apparatus incapable of delivering more fuel than is required to produce limiting values of speed and temperature above which sustained operation is unsafe.

While a given condition of brake-horsepower and engine torque predetermines the speed of a given engine, the fuel flow required to produce a given value of engine speed varies as a function of altitude, speed of flight, combustion temperature, quality of fuel, and other factors. There is, therefore, no generally predictable relationship between engine speed and fuel flow which enables the operator to predetermine the engine speed by predetermining the fuel flow.

It is an object of my invention to provide improved fuel and speed control apparatus for an internal combustion engine whereby the engine speed is maintained in predetermined relationship with a pre-established motor speed.

It is also an object of this invention to provide, in apparatus of the type described, improved means for varying the fuel flow to maintain a value of engine speed predetermined by the position of a single control lever.

Another object of my invention is to provide improved fuel and speed control apparatus for an internal combustion engine wherein a manually operated lever is positioned according to operating conditions in said engine to produce a desired value of speed.

Another object of the present invention is to provide, in such apparatus, means for controlling the fuel flow to prevent speed and temperature values in excess of predetermined limits.

A further object of my invention is to provide fuel and speed control apparatus of improved simple design which tends to minimize hunting of the engine.

Other objects and advantages of the present invention will become apparent from a consideration of the appended specification, claims and drawing, in which:

Figure 1 illustrates, somewhat diagrammatically, fuel control apparatus embodying principles of my invention and the relationship of such apparatus with an internal combustion engine and associated means which include a fuel pump, and Figure 2 illustrates, also somewhat diagrammatically, another embodiment of my invention and its relationship with the engine of Figure 1.

Figure 1

Referring to the drawing, Figure 1, there are shown the principal elements of an internal combustion engine suitable for propeller-propulsion or propeller-and-jet propulsion of aircraft, as follows: a supporting casing 10, an air inlet 12, a multi-stage compressor indicated as 14, a compressor rotor shaft 16, a combustion chamber 18, a number of fuel discharge nozzles one of which is designated 20, a generally circular manifold 22, a multi-stage turbine indicated as 24, a turbine rotor shaft 26 connected to the compressor rotor shaft 16, a tail pipe 28 for discharge of combustion gases from turbine 24, a center bearing 30 and end bearings 32 and 34 supported by casing 10, a propeller shaft 36, and a gear train 38 connecting shaft 36 to shaft 16.

The fuel manifold 22 in the engine is connected by a conduit 40 to a variable delivery fuel pump 42. Pump 42 is driven by the engine thru a gear 44 and is connected to a source of fuel by a fuel inlet conduit 46. The delivery of pump 42 is variable in response to movement of a lever 47 which is controlled by the fuel and speed control apparatus, the principal elements of which are identified in the immediately following brief account of its operation.

In the embodiment shown in Figure 1, the speed of an hydraulic motor is maintained at a value proportional to the desired engine speed, the motor speed being controlled by regulating the flow of oil from the engine to the motor along a path including the following elements, in the stated order: an oil supply conduit 48 connected to the engine at a source of oil at a high pressure $(p_1)$, a valve sleeve 86 in a valve mechanism 54, a valve 88, a port 104, a conduit 98, the motor 100, a conduit 102, and a drain conduit 50 connected to the engine at a source of oil at a relatively low pressure $(p)$. The position of valve 88 controls the flow of motor oil along the path above defined and is determined by a pressure $(p_3)$ in a chamber 94 at the left end of valve 88, the substantially constant value of pressure $(p_3)$ being predetermined by the position of a lever 84 in a pressure regulator 66. The pressure in chamber 94 tends to move valve 88 to the right in opposition to a force produced by a speed responsive device 106 operated by motor 100, the force produced by said device having a value predetermined by the motor speed and being substantially constant when the motor speed and the pressure in chamber 94 are constant, whereby there is a substantially constant value of the motor speed corresponding to the position of lever 84. A control mechanism 112, connected to the engine and to motor 100, detects any difference between the actual engine speed and the desired engine speed as measured by the motor speed, and responds to occurrence of such a difference by moving lever 47 to vary the fuel flow in a sense to restore the actual engine speed to the desired value. The apparatus includes a thermal control 134 which automatically prevents excessive engine temperatures by reducing the speed of motor 100 whenever a predetermined value of temperature is exceeded. Excessive engine speed is also prevented by limiting the travel of lever 84 and hence the value of the motor speed.

Again referring to Figure 1, in detail, oil supply conduit 48 is shown connected across valve mechanism 54 to a conduit 52, the pressure in which is $(p_1)$ as in conduit 48. Conduits 48 and 52 may be directly connected to each other, if desired.

Another passage for the flow of oil from the engine is provided thru conduit 48, across mechanism 54, and thru conduit 52, a restriction 56 at the lower end of conduit 52, a conduit 58 and another conduit 60 connected thereto, a generally cylindrical chamber 62 in a body 64 of the pressure regulator 66, and a valve seat 68 in the closed end of body 64 approximately on the centerline of chamber 62, to drain conduit 50 at pressure $(p)$.

A bellows 70 has one end fixed in chamber 62 to the lower end of body 64 in which there is an aperture 72. On the other end of bellows 70 is a valve 74 operable to vary the effective area of flow thru valve seat 68 in the upper end of body 64. A spring 76, in compression inside bellows 70 between the free end of the bellows and a support 78, tends to move valve 74 upward toward seat 68 with a force which depends on its initial length and on its rate and deflection. A cam 80, mounted on a shaft 82 is operable by the manually controlled lever 84 to vary the deflection and hence the force of spring 76.

In operation of the pressure regulator 66, fluid enters chamber 62 thru conduit 60 and subjects bellows 70 to the differential between the fluid pressure $(p_3)$ in chamber 62 and the atmospheric pressure $(p_A)$ inside the bellows. The differential $(p_3-p_A)$, or the gage pressure $(p_3)$, produces a force proportional to the area of the bellows 70 in opposition to the force of spring 76. Since the position of valve 74 in steady state operation is determined by a condition of balance between forces acting on bellows 70, it follows that, when the position of support 78 is constant, the valve seeks a position at which sufficient flow is allowed to occur from chamber 62 to conduit 50 to reduce the value of the pressure $(p_3)$ so that the upward force of spring 76 balances the downward force due to the pressure $(p_3)$ acting on bellows 70. The pressure $(p_3)$ is thus maintained substantially constant at a value predetermined by the deflection of spring 76 and hence by the position of lever 84.

The restriction 56 limits the area of flow from conduit 52 so that, as flow past valve 74 increases, the pressure $(p_3)$ downstream from restriction 56 decreases. The respective areas of restriction 56 and valve seat 68 are such that the regulator 66 operates within acceptable limits of travel of valve 74 and regulates the pressure $(p_3)$ within a desired range and with a desirable degree of accuracy.

In valve mechanism 54, valve 88 is slidable in a cylindrical bore 90 inside sleeve 86, the left-hand end of which is closed and connected to conduit 60 by a conduit 92. The pressure $(p_3)$ is thus transmitted from conduit 60, thru conduit 92, to chamber 94 at the left-hand end of valve 88. Valve 88 is provided with an annular undercut 96 which permits flow of fluid from conduit 48, past undercut 96, and thence into conduit 52 and also into conduit 98 and thence thru motor 100 to drain conduit 50. The volume of oil entering motor 100 and hence the motor speed is a function of the effective area of flow of part 104 to which conduit 98 is connected. The valve 88 is operable to vary the effective area of flow thru port 104 in response to the speed responsive device 106 which is operated by a shaft 108 at the speed of motor 100. If desired, the speed responsive device 106 may be operated at any suitable proportional value of the motor speed.

Device 106 is connected to valve 88 at a groove 111 provided at the right end of the valve, and moves valve 88 leftward in opposition to the pressure $(p_3)$ in chamber 94, as the speed increases. For any given substantially constant value of the pressure $(p_3)$, therefore, there is a corresponding substantially constant value of motor speed which produces equilibrium of forces acting on valve 88, and hence positions valve 88 to control the flow thru port 104 and the motor. Assuming substantially constant characteristics of performance of motor 100 and a substantially constant value of the pressure $(p)$ in conduit 102, it is apparent that the speed of motor 100 is predetermined by the value of the pressure $(p_3)$ in chamber 94 and conduits 92 and 60.

The lever 84 is operated in reference to a calibrated quadrant, not shown, which enables the operator to visually select the correct lever position corresponding to the value of the pressure $(p_3)$ and hence to the respective desired values of the motor and engine speeds.

The condition of equilibrium of forces acting on valve 88, and therefore its position, may be disturbed by increase or decrease of either the motor speed or the value of pressure $(p_3)$. Assuming valve 88 in a position of equilibrium, the response to motor speed changes may be explained as follows:

(1) When the motor speed tends to exceed the predetermined value, valve 88 moves leftward, the effective area of flow thru port 104 is decreased, the motor speed therefore is decreased, and equilibrium is restored at the predetermined motor speed corresponding to the value of pressure $(p_3)$.

(2) Similarly, when the speed of motor 100 tends to drop below the predetermined value, valve 88 is moved toward the extreme position shown in the drawing, at which the effective area of flow thru port 104 is maximum. Before or approximately upon reaching such a position, however, the flow thru port 104 will have been sufficiently increased to increase the speed of motor 100 and hence restore the speed to the desired predetermined value.

(3) When the pressure $(p_3)$ is changed by movement of the lever 84, a temporary condition follows during which valve 88 seeks a new position of equilibrium and the speed of motor 100 changes to another substantially constant predetermined lesser or greater value, depending on whether the pressure $(p_3)$ is decreased or increased. Counterclockwise movement of lever 84 from the position shown increases the motor speed.

Motor 100 is connected by a shaft 110 to control mechanism 112 which includes a sun gear 114 mounted on and driven by shaft 110 which rotates in a clockwise direction. Gear 114 engages a similar planet gear 116 mounted on a stub shaft 118, gear 116 being engaged with a ring gear 120 mounted on a shaft 122 and operated by the engine at a speed proportional to engine speed, in a counterclockwise direction. Both shaft 122 and shaft 110 have fixed centerlines. With a slight increase in the respective diameters of gears 114 and 116, the centerline of shaft 110 may be made to coincide with that of shaft 122 according to conventional practice in differential gearing; separation of the shaft centerlines, as shown, is permitted as a result of the relatively small movement of a lever 124, which holds gears 114 and 116 in proper relationship with each other and in which shaft 118 is fixed. Lever 124 is hinged to shaft 110.

The relative sizes of gears 120 and 114 are selected so that when the actual engine speed, indicated by the speed of counterclockwise rotation of gear 120, is equal to the desired engine speed, indicated by the speed of clockwise rotation of gear 114, the tooth velocities of gears 114 and 120 are equal. The ratio of the desired engine speed to the motor speed, or to the speed of rotation of gear 114, therefore differs from the ratio of the actual engine speed to the speed of rotation of gear 120 according to the ratio of the respective numbers of teeth in gears 114 and 120. In a condition in which the actual engine speed equals the desired engine speed, or in which the tooth velocities of gears 114 and 120 are equal, the centerline of shaft 118 and hence lever 124 remains stationary, while gear 116 rotates on shaft 118.

Among other possible arrangements of gears which are alternate to the arrangement shown, there is included an assembly of three bevel gears having an identical number of teeth in each. In such an assembly, the ratio between the motor speed and the speed of rotation of a bevel gear corresponding to gear 114 is identical with the ratio between the actual engine speed and the speed of rotation of a bevel gear corresponding to gear 120.

When the actual engine speed exceeds a desired value, or when the tooth velocity of gear 120 exceeds that of gear 114, gear 116 and shaft 118 are caused to move in a counterclockwise direction relative to the center of shaft 110, thereby moving lever 124 towards stop 126. A link 130 connects shaft 118 to lever 47 so that as lever 124 moves toward stop 126, lever 47 moves clockwise to decrease the delivery of pump 42. The engine speed is consequently reduced until the desired value is restored, lever 124 then occupying a new position between stops 126 and 128 depending upon the amount of movement of lever 47 required to accomplish the fuel delivery decrease.

Similarly, when the actual engine speed is less than a desired value, or when the tooth velocity of gear 120 is less than that of gear 114, gear 116 and shaft 118 are caused to move in a clockwise direction relative to the center of shaft 110, thereby moving lever 124 towards stop 128. Lever 47 is correspondingly moved counterclockwise to increase the delivery of pump 42. The engine speed is consequently increased until the desired value is restored, lever 124 then occupying a new position between stops 126 and 128 depending upon the amount of movement of lever 47 required to accomplish the fuel delivery decrease.

At maximum and minimum pump delivery settings determined by extreme positions of lever 47, lever 124 just clears stops 128 and 126, respectively, and the fuel pump delivery varying means is correspondingly positioned for maximum and minimum delivery.

When the actual engine speed deviates from the desired value predetermined by the speed of motor 100, so that the tooth velocity of gear 120 differs from that of gear 114 to such an extent that lever 124 moves against stop 126 or 128, the engine is then direct-connected to the motor thru gears 120, 116 and 114. If lever 124 is against stop 126, as is the case when the engine speed is greater than desired, motor 100 is driven by the engine at a speed greater than that corresponding to the position of lever 84. This condition imposes no hardship on the motor or other elements of the apparatus, however, and is temporary.

With lever 124 against stop 126, the fuel pump delivery has a minimum value which quickly reduces the engine speed and permits restoration of the desired speed at which lever 124 is moved off stop 126. Similarly, if lever 124 is against stop 128, as is the case when the engine speed is less than desired, the engine temporarily decreases the motor speed. In this case, however, with lever against stop 128, the fuel pump delivery has a maximum value which quickly increases the engine speed, thereby restoring the desired speed at which lever 124 is moved off stop 128.

Thermal control 134 is provided to protect the engine against the possibility of excessive operating temperatures, control 134 being effective to reduce the pressure $(p_3)$ and hence the motor speed when a predetermined value of temperature is exceeded. Thus, following such reduction of motor speed, there is a corresponding reduction of engine speed produced by fuel flow decrease which restores the engine temperature to safe operating values.

Thermal control 134 comprises a body 136 having a wall 138 separating an outlet chamber 140 from an inlet chamber 142. Inlet chamber 142 is connected to conduit 60 and outlet chamber 140 is connected to drain conduit 50 by a conduit 154. One end of a thin-walled tube 144 is fixed to the closed end of body 136 nearest inlet chamber 142, and has attached to its other end, which is closed, a rod 146 which is slidable in a centrally located aperture 148 in the end of body 136 to which tube 144 is fixed. The free end of rod 146 is contoured to form a valve 150, which is operable in a seat 152 in wall 138. Tube 144 and rod 146 are made from materials having substantially different coefficients of thermal expansion and the unit is installed in the engine, as shown diagrammatically, with tube 144 exposed to the temperature of combustion gases in the tail pipe 28 of the engine, or at any other desired control point. As the temperature increases, the tube 144 expands faster than the rod 146, thereby increasing the effective area of opening between valve 150 and seat 152. Generally, control 134 is made so that the valve remains closed until a limiting value of temperature is exceeded.

When valve 150 is closed, as is normally true, no flow occurs in thermal control 134 and the pressure ($p_3$) is a function solely of movement of lever 84.

When valve 150 is open, however, as is the case when the predetermined value of limiting temperature is exceeded, flow occurs thru conduit 60, chamber 142, past valve 150, thru chamber 140, and thence thru conduit 154 to drain conduit 50. As valve 150 opens to permit such flow, the pressure ($p_3$) in conduit 60 decreases owing to increased flow thru restriction 56. The speed of motor 100 consequently decreases, the fuel flow decreases to provide a corresponding engine speed decrease and the engine temperature is thereby reduced. Valve 150 is restored to closed position and the pressure ($p_3$) is restored to its normal value when the engine temperature equals or falls below the predetermined limiting value. Normal operation of the apparatus is then reestablished.

Protection of the engine from over-speeding is provided by limiting the travel of lever 84. There is thus a maximum value of the pressure ($p_3$) and hence maximum predetermined values of the motor and the engine speeds.

In steady state operation, engine speed deviations from the desired value determined by the speed of motor 100 generally occur slowly and are of small magnitude. The response of gear 120 to changes in engine speed is immediate and, similarly, the response of lever 124 and hence of the delivery varying means to such variations in engine speed is also immediate. Time lag, therefore, between demand for a change of fuel flow and the occurrence of such change is of sufficiently small proportions to prevent hunting. Upon rapid movement of control lever 84, the consequent change of motor speed is not equally rapid owing to inertia of the motor and to the time required for change of the rate of flow thru valve 88. The delivery varying means, however, immediately responds to changes in the motor speed so that hunting in this case is also prevented.

*Figure 2*

Referring to the drawing, Figure 2, there is shown another embodiment of my invention connected to the diagrammatically illustrated engine of Figure 1. A variable delivery fuel pump 158, driven by the engine or other suitable means thru a gear 160, is connected to an indicated source of fuel by a conduit 162 and to manifold 22 of the engine by a conduit 164. The delivery of pump 158 is variable in response to movement of a lever 166 which is controlled by the fuel and speed control apparatus between extreme counterclockwise and clockwise positions corresponding to minimum and maximum fuel flow and engine speed.

Principal elements of the apparatus include a differential gear mechanism 168, a governor valve mechanism 170, a thermal control 134 the same as or equivalent to the control 134 of Figure 1, and an hydraulic motor 172.

The differential gear mechanism 168 includes: a segmental gear 174 rotatable thru a predetermined arc on a fixed shaft 176, there being a manually operated control lever 178 fixed to gear 174; a sun gear 180 rotatable on fixed shaft 176; an arm 182 fixed to sun gear 180 and connected to lever 166 by a link 184 so that the delivery varying means is responsive to rotation of the sun gear; a planet gear 186 rotatable on a stub shaft 188 for transmitting movement of segmental gear 174 to sun gear 180; a link 190 connecting shafts 176 and 188 for allowing shaft 188 to be moved about shaft 176 as a center; and a link 192 connected to shaft 188 and the left end of a lever 194 which has its right-hand end fixed to a shaft 196. The shaft 196 is rotatable in response to movement of a worm gear 200 fixed to shaft 196 and in engagement with a worm gear 200 fixed to shaft 196 and in engagement with a worm 198 on a shaft 202. Self-locking action of the worm and worm gear prevents rotation of shaft 202 in response to movement of lever 194 and shaft 196.

Governor valve mechanism 170 includes a speed responsive device 204 operated by gearing 206 which is driven at a speed proportional to engine speed. A valve 208 is slidably operated by device 204 in a valve guide 210. Valve 208 has an undercut 212 forming an annular chamber 214 between valve 208 and guide 210. Between the respective right-hand ends of valve 208 and guide 210 there is a chamber 216 connected to annular chamber 214 by a channel 218. A port 220 in guide 210 is connected to a source of oil at a substantially constant pressure ($p_1$) by conduit 164, as in Figure 1; and another port 222 is similarly connected to a source of oil at a relatively low pressure ($p$) by means of conduit 165, also as in Figure 1. Any other hydraulic fluid source providing a suitable value of the differential ($p_1-p$) may be employed if desired.

In the neutral position of valve 208 shown, both ports 220 and 222 are just closed. When valve 208 is moved to the right from its neutral position, oil may flow from conduit 164, thru port 220, chamber 214, and channel 218, to chamber 216. Correspondingly, when valve 208 is moved leftward from its neutral position, oil may flow from chamber 216, thru channel 218, chamber 214, and port 222, to conduit 165. The valve is subject to opposite forces produced by device 204 and the pressure ($p_4$) in chamber 216 and is in equilibrium when these forces are equal, the value of pressure ($p_4$) therefore being determined by the value of engine speed. It is thus apparent that in a condition of equilibrium, valve 208 is in its neutral position, no flow occurs past the valve, the engine speed is constant corresponding to a steady state condition of engine operation, and pressure ($p_4$) is substantially constant and has a value corresponding to the value of the engine speed.

The hydraulic motor 172 includes a housing 224 bored for operation of a piston 226 therein. A chamber 228 above piston 226 is connected to chamber 216 thru a conduit 240 so that pressure ($p_4$) is transmitted to chamber 228. A chamber 238 below piston 226 is connected to conduit 164 thru a conduit 230, a restriction 234, and another conduit 236. As subsequently explained, during normal operation, there is no flow thru restriction 234 so that the pressure ($p_1$) in conduit 164 is normally transmitted along the above defined path to chamber 238. Thus, piston 226 is normally subject to an upward force proportional to the pressure differential ($p_1-p_4$) which varies inversely as the engine speed; i.e., ($p_1-p_4$) has a maximum value when the value of engine speed is minimum, and ($p_1-p_4$) has a minimum value when the value of engine speed is maximum. Piston 226 is biased downward by a spring 242 but remains in its extreme upward position until the engine speed increases to a predetermined value and the pressure differential ($p_1-p_4$) decreases so that the downward spring force exceeds the upward force of the differential. When this occurs, piston 226 moves downward and is in an extreme downward position when the engine speed exceeds a preselected limiting value.

Piston 226 is connected to a lever 244 fixed to shaft 202, by means of a rod 246, so that when piston 226 is in its extreme upward and downward positions, respectively, shaft 202 is at corresponding extreme limits of counterclockwise and clockwise rotation.

The thermal control shown diagrammatically in Figure 2 exactly corresponds to its counterpart in Figure 1 and has been given the same reference numeral 134. It will not be described in detail in connection with the present figure. Thermal control 134 is connected to conduit 230 by an inlet conduit 232 corresponding to the connection of the thermal control of figure 1 with conduit 60. Similarly, a conduit 248, corresponding to conduit 154 of Figure 1, connects the thermal control to drain conduit 165. As explained in connection with Figure 1, a portion of the control 134 is subjected to the engine temperature and prevents flow from conduit 232 to conduit 248 at normal engine temperatures. When the engine temperature exceeds a predetermined limiting value, however, the thermal control allows flow to occur from conduit 232, thru the thermal control, to conduit 248. The consequent flow through restriction 234 is accompanied by a pressure drop in conduit 230 and chamber 238. The apparatus is designed and constructed so that flow occurring at an excessive engine temperature produces a sufficient drop in value of the pressure in chamber 238, so that piston 226 moves downward to its extreme position.

It is thus apparent that when the engine speed or engine temperature exceeds preselected limiting values, piston 226 moves downward and shaft 202 turns clockwise to extreme limiting positions. When the values of engine speed and temperature are respectively in normal operating ranges and hence below the preselected limiting values, piston 226 moves upward so that shaft 202 is in its extreme position of counterclockwise travel corresponding to the "Normal Position" of lever 244 shown in the dotted lines of Figure 2.

In operation, at speeds and temperatures below the limiting values referred to, the positions of shaft 196 and lever 194 are fixed corresponding to the normal position of shaft 202. Link 192 and shaft 188 are also fixed and the positions of levers 182 and 166 depend upon that of manually operated lever 178. In normal operation, the differential gear mechanism serves only to vary the position of lever 166 and hence to vary the fuel flow as a function of movement of lever 178, there being a predetermined position of lever 166, and therefore a predetermined value of fuel flow, for every position of the manually operated lever 178.

When lever 178 is moved counterclockwise from the position shown, with shaft 196 fixed as in normal operation, planet gear 186 is rotated counterclockwise on shaft 188, and sun gear 180 is correspondingly rotated in a clockwise direction causing lever 182 and link 184 to operate lever 166 in a delivery increasing direction. Conversely, when lever 178 is rotated clockwise, planet gear 186 also rotates clockwise, and sun gear 180 turns in a counterclockwise direction to operate lever 166 in a delivery decreasing direction.

Assuming that the position of lever 166 is fixed and that the engine is operating at a speed less than the limiting value; when the engine speed changes, owing to a change in engine operating conditions, the pressure ($p_4$) in chamber 216 and 228 changes, but there is no movement of piston 226 and hence no change of fuel flow until the speed becomes excessive; i. e., until the speed exceeds the predetermined limiting value. When this occurs, piston 226 is moved downward as previously explained so that shaft 202 is moved to an extreme counterclockwise position. Counterclockwise movement of shaft 202 and hence of worm 198 causes counterclockwise movement of worm gear 200 and shaft 196. Upon counterclockwise movement of shaft 196 and lever 194, link 192 moves downward, and shaft 188 moves in a circular path in a counterclockwise direction around shaft 176 as a center, causing planet gear 186 to rotate clockwise on shaft 188 because of its engagement with ring gear 174. Sun gear 180 is rotated counterclockwise by gear 186, thereby moving lever 182, link 184, and lever 166 in a delivery decreasing direction. As the delivery decreases the engine speed decreases, pressure ($p_4$) decreases and when the speed is less than the predetermined value, piston 226 rises to the normal position corresponding to the normal position of shaft 196. In this manner, manual regulation of the pump delivery and hence manual regulation of engine speed is subject to override by the governor valve mechanism 170 and motor 172. The amount of override control is such that when lever 178 is fixed in its extreme counterclockwise position, corresponding to maximum pump delivery, movement of piston 226 from its normal position to its extreme downward position causes movement of lever 166 to a position corresponding to minimum delivery.

Response of the apparatus to engine temperatures exceeding the predetermined limiting value is identical with that in the case of over speeding, after the pressure in chamber 238 is sufficiently reduced to cause movement of piston 226 to its extreme downward position.

Use of the control apparatus of Figure 2 requires manipulation of the control lever 178 into whatever position is required to obtain a desired value of speed indicated by a tachometer 250 or equivalent speed indicating device. As the engine speed varies the operator readjusts the lever position to maintain the desired value of speed.

In the apparatus of Figure 2, response of the delivery varying means to movement of control lever 180 is immediate. Similarly, response of device 204 to changes in engine speed is also immediate; hunting of the engine is therefore prevented by the absence of time lag between demand for a change of fuel flow and the occurrence of such a change.

The terms and expressions herein are employed for purposes of description and not of limitation, and I have no intention, in the use of such terms and expressions, of excluding any equivalents of the features shown and described or portions thereof, but recognize that various modifications are possible within the scope of the invention claimed.

I claim as my invention:

1. Control apparatus for a pump having means for varying the delivery thereof, there being operatively associated with said pump a rotating device whose speed is responsive to said pump delivery, comprising: a manually operated lever, a control lever connected to said delivery varying means for control thereof; and a differential gear mechanism including first and second positionally movable gears positionally responsive respectively to the speed of said device and to said manually operated lever, and a third gear responsive to the differential movement of said first and second gears and connected to said control lever for actuating said control lever.

2. Control apparatus for a pump having means for varying the delivery thereof, there being operatively associated with said pump a rotating mechanism whose speed is responsive to said pump delivery, comprising: a manually operated lever, a control lever connected to said delivery varying means for control thereof; and a differential gear mechanism including first and second positionally movable gears positionally responsive respectively to said speed and to said manually operated lever, and a third gear responsive to the differential movement of said first and second gears for actuating said control lever in a delivery decreasing direction when a predetermined value of speed is exceeded.

3. Control apparatus for a pump having means for varying the delivery thereof, there being associated with said pump a speed device whose speed is responsive to said pump delivery, comprising: a differential gear mechanism including a segmental ring gear having a fixed shaft at the center thereof and being manually rotatable on said fixed shaft, a sun gear rotatable on said fixed shaft and adapted to control said delivery varying means as a function of the rotation of said sun gear, and a planet gear for transmitting movement of said ring gear to said sun gear, a stub shaft for rotation of said planet gear thereon, a connecting link between said fixed and said stub shafts for maintaining a predetermined distance between the respective centers of said shafts, and operating means for rotating said connecting link on said fixed shaft to control the rotation of said sun gear and hence said delivery varying means independently of movement of said ring gear, whereby said delivery is a function of the manual operation of said ring gear and the operation of said operating means.

4. Control apparatus as set forth in claim 3, including means responsive to the speed of said device for controlling said operating means, whereby said delivery is a function of the manual operation of said ring gear and the speed of said device.

5. Control apparatus as set forth in claim 3, including means responsive to the speed of said device and adapted when said speed exceeds a predetermined value to actuate said operating means in a sense to restore said predetermined value of speed.

6. Control apparatus as set forth in claim 3, including a governor mechanism responsive to the speed of said device and adapted to control said operating means, and means responsive to an operating temperature in said speed device for overriding said governor mechanism to actuate said operating means when a predetermined value of said temperature is exceeded.

7. Control apparatus as set forth in claim 3, including a source of hydraulic fluid and a conduit for the flow of fluid from said source, governor valve means having a valve therein responsive to said speed of said device, said valve being adapted to control the pressure downstream from a portion of said conduit as a function of said speed, and motor means responsive to said downstream pressure in said conduit portion and adapted to control said operating means.

8. Control apparatus as set forth in claim 3, including a source of hydraulic fluid and a conduit for the flow of fluid from said source, a valve for controlling said conduit flow to regulate a pressure downstream from a portion of said valve, channel means for subjecting one end of said valve to said downstream pressure, said valve having a neutral position thereof wherein the value of said conduit flow is substantially zero and said downstream pressure is substantially constant, means responsive to said speed of said device, said valve being responsive to said last means in opposition to said downstream pressure thereby rendering said downstream pressure a predetermined function of said speed when said valve is in its neutral position, said operating means being responsive to said downstream pressure; and said valve being adapted, when said speed exceeds a predetermined value to vary said downstream pressure and hence to actuate said operating means and said delivery varying means in a sense to restore said predetermined value of speed.

9. Fuel and speed control apparatus for an internal combustion engine having a pump with means for varying the delivery of fuel to said engine, comprising: a source of hydraulic fluid and a conduit for the flow of fluid from said source, a valve for controlling said conduit flow to regulate a pressure downstream from a portion of said valve, channel means for subjecting one end of said valve to said downstream pressure, and a device responsive to the speed of said engine, said valve being responsive to said device in opposition to a force proportional to said downstream pressure and having a neutral position thereof wherein said downstream pressure has a substantially constant value corresponding to a substantially constant value of said speed, control means for operating said delivery varying means in response to said downstream pressure; said valve being adapted, when said speed exceeds a predetermined limiting value, to move from said neutral position in a sense to vary said downstream pressure to restore said predetermined value of speed and to return said valve to said nuetral position.

10. Fuel and speed control apparatus as set forth in claim 9, including a thermal control for modifying the response of said control means in a sense to decrease said delivery independently of said downstream pressure when a predetermined value of engine temperature is exceeded.

11. Fuel and speed control apparatus for an internal combustion engine having a pump for delivering fuel thereto, comprising: a differential gear mechanism including a fixed shaft and a segmental ring gear rotatable thereon, a manually operated control lever for rotating said ring gear, a sun gear rotatable on said fixed shaft for operation of said delivery varying means, a stub shaft and a planet gear rotatable thereon for operation of said sun gear by said ring gear, a connecting link between said fixed and said stub shafts for maintaining a predetermined distance between the respective centers of said shafts, control means for varying the angular position of said connecting link to vary the position of said stub shaft, said control means being operable to modify rotation of said sun gear in response to movement of said ring gear and being similarly operable when the position of said control lever is fixed to produce rotation of said sun gear, and means responsive to the speed and temperature of said engine for operating said control means, said speed and temperature responsive means being adapted when said speed and/or said temperature exceed predetermined values to operate said control means in a sense to reduce said delivery, whereby the fuel flow to said engine is a function of the position of said control lever and said speed and said temperature.

12. Control apparatus for an internal combustion engine having a pump for delivering fuel thereto, said pump having means for varying its delivery, comprising: a manually operated control lever, adapted to be moved to a selected position corresponding to a desired engine speed, a control arm connected to said delivery-varying means and adjustable means connected between said lever and said arm, said arm being variably responsive to the movement of said lever; and means responsive to the actual speed of the engine and to the movement of said arm for adjusting said adjustable means, so as to modify the movement of said arm in response to the movement of said lever, in proportion to any difference between actual engine speed and the desired engine speed corresponding to the position of said lever, whereby the fuel delivery of said pump is so controlled as to cause the actual speed of the engine to correspond to the selected desired speed.

13. Fuel and speed control apparatus for an internal combustion engine having a pump for supplying fuel thereto, said pump having movable means for varying the delivery of fuel to control the speed of said engine, comprising: a manual control lever, first means, responsive to said lever, for positioning said delivery-varying means so as to cause said engine to operate at a selected speed, second means responsive to the actual speed of the engine and operatively associated with said delivery-varying means, and third means operatively associated with said first and second means and adapted, when the ratio between said selected and actual engine speeds deviates from a predetermined value, to operate said delivery-varying means in a sense to eliminate said deviation and thereby restore said speed ratio to said predetermined value, whereby said engine is caused to operate at said selected speed under varying operating conditions.

14. Speed control apparatus for a prime mover having means for supplying thereto a motive fluid for operating said prime mover, comprising: means for regulating the flow of said fluid to said prime mover, a servomotor operatively connected to said regulating means, a separate source of liquid under pressure, a conduit for supplying said liquid to said motor, a valve in said conduit for controlling the flow of said liquid to said motor, and a mechanical centrifugal governor, driven by and solely responsive to the speed of said prime mover, for operating said valve in accordance with said speed, so that said speed is automatically maintained at a constant value under varying loads; the pressure in said conduit between said valve and said servomotor exerting on said valve an axial thrust which is opposed by said governor thrust, whereby the position of said valve is varied in accordance with the difference between said thrusts.

LEIGHTON LEE II.

References Cited in the file of this patent

UNITED STATES PATENTS

| Number | Name | Date |
|---|---|---|
| 1,483,536 | Warren | Feb. 12, 1924 |
| 1,644,167 | Best | Oct. 4, 1927 |
| 1,752,135 | Wünsch | Mar. 25, 1930 |
| 2,069,230 | Ferris | Feb. 2, 1937 |
| 2,136,959 | Winfield | Nov. 15, 1938 |
| 2,198,035 | Ferris | Apr. 23, 1940 |
| 2,219,994 | Jung | Oct. 29, 1940 |
| 2,245,562 | Becker | June 17, 1941 |
| 2,399,685 | McCoy | May 7, 1946 |
| 2,405,888 | Holley | Aug. 13, 1946 |
| 2,411,065 | Silvester | Nov. 12, 1946 |
| 2,514,674 | Schorn | July 11, 1950 |